(12) United States Patent
Zhang

(10) Patent No.: US 7,450,554 B2
(45) Date of Patent: Nov. 11, 2008

(54) METHOD FOR ESTABLISHMENT OF A SERVICE TUNNEL IN A WLAN

(75) Inventor: Wenlin Zhang, Shenzhen (CN)

(73) Assignee: Huawei Technologies Co., Ltd., Shenzen (CN)

(*) Notice: Subject to any disclaimer, the term of this patent is extended or adjusted under 35 U.S.C. 154(b) by 32 days.

(21) Appl. No.: 11/261,375

(22) Filed: Oct. 28, 2005

(65) Prior Publication Data

US 2006/0104234 A1    May 18, 2006

Related U.S. Application Data

(63) Continuation of application No. PCT/CN2004/001393, filed on Dec. 1, 2004.

(30) Foreign Application Priority Data

Dec. 8, 2003    (CN)    ................. 2003 1 0118239

(51) Int. Cl.
*H04Q 7/24*    (2006.01)
*H04L 12/28*    (2006.01)
*H04L 9/32*    (2006.01)

(52) U.S. Cl. .................. 370/338; 370/401; 380/247

(58) Field of Classification Search ................ 370/338, 370/349, 401; 380/270, 277, 278; 726/2, 726/3, 4, 5
See application file for complete search history.

(56) References Cited

U.S. PATENT DOCUMENTS

| 2002/0174335 A1 | 11/2002 | Zhang et al. ............. 713/168 |
| 2003/0172090 A1* | 9/2003 | Asunmaa et al. ........... 707/200 |
| 2004/0019806 A1* | 1/2004 | Beyh ...................... 713/201 |
| 2004/0066769 A1* | 4/2004 | Ahmavaara et al. ......... 370/338 |
| 2004/0139201 A1 | 7/2004 | Chaudhary et al. .......... 709/229 |

(Continued)

OTHER PUBLICATIONS

ETSI. Universal Mobile Telecommunications System (UMTS); 3G security; Wireless Local Area Network (WLAN) interworking security 3GPP TS 33.234 V 6.2.1 (Release 6). Sep. 9, 2004. pp. 1-76.*

(Continued)

*Primary Examiner*—Andrew Lee
(74) *Attorney, Agent, or Firm*—Marshall, Gerstein & Borun LLP

(57) ABSTRACT

Disclosed herein is a method for the establishment of a service tunnel in a wireless local area network (WLAN). The method includes a service authentication authorization unit making authentication and authorization to a WLAN user terminal currently requesting a service, and judging whether the authentication and authorization is successful. If successful, the method includes generating service authorization information that includes a shared communication key used for communication between the WLAN user terminal and a destination packet data gateway (PDG), and otherwise ending the procedure. The method further includes the service authentication authorization unit sending to the destination PDG the generated service authorization information including the shared communication key, and the destination PDG, according to the shared communication key, establishing a trust relation with the WLAN user terminal through negotiation with the WLAN user terminal. If the establishment of the trust relation is successful, the destination PDG allocates tunnel resources for the WLAN user terminal, negotiates parameters and then establishes a tunnel with the WLAN user terminal, and otherwise, ends the procedure. As a result, a secured service data tunnel may be established between the user terminal and the PDG.

22 Claims, 6 Drawing Sheets

U.S. PATENT DOCUMENTS

2005/0154895 A1* 7/2005 Zhang ................... 713/182
2006/0002351 A1* 1/2006 Madour ................... 370/338
2006/0019635 A1* 1/2006 Ollila et al. ............. 455/411
2007/0124592 A1* 5/2007 Oyama ................... 713/171

OTHER PUBLICATIONS

Kaufman. "Internet Key Exchange (IKEv2) Protocol". draft-ietf-ipsec-ikev2-14.txt. May 29, 2004. pp. 1-106.*
International Search Report for PCT/CN2004/001393, dated Mar. 10, 2005.

* cited by examiner

METHOD FOR ESTABLISHMENT OF A SERVICE TUNNEL IN A WLAN

CROSS-REFERENCES TO RELATED APPLICATIONS

This is a continuation of International Application No. PCT/CN2004/001393, which was filed on Dec. 1, 2004, and which, in turn, claimed the benefit of Chinese Patent Application No. 200310118239.0, which was filed on Dec. 8, 2003, the entire disclosures of which are hereby incorporated herein by reference.

BACKGROUND OF THE DISCLOSURE

1. Field of the Technology

The present invention relates to a tunnel establishment technique and, more particularly, to a method for establishment of a service tunnel for a service requested by a user terminal in a Wireless Local Area Network (WLAN).

2. Background of the Invention

With user demands for an increasingly high rate of wireless access, there emerges the WLAN, which is able to provide high-rate wireless data access in a relatively small area. Various techniques have been used in WLAN, among which a technical standard with more applications is EEE 802.11b. This standard involves the frequency band of 2.4 GHz with a data transmission rate up to 11 Mbps. Other technical standards involving the same frequency band include IEEE 802.11g and Bluetooth, where the data transmission rate of IEEE 802.11g is up to 54 Mbps. There are other new standards such as IEEE 802.11a and ETSI BRAN Hiperlan2 which use the frequency band of 5 GHz with the transmission rate up to 54 Mbps as well.

Although there are various techniques for wireless access, most WLANs are utilized to transfer IP data packets. The specific WLAN access technique adopted by a wireless IP network is usually transparent to the upper level IP. Such a network is usually configured with Access Points for implementing wireless access of a user terminal and with controlling and connecting devices for implementing IP transmission.

Along with the rising and developing of WLAN, focus of research is shifting to the inter-working of WLAN with various mobile communications networks, such as GSM, CDMA, WCDMA, TD-SCDMA, and CDMA2000. In accordance with the 3 GPP standards, a user terminal is able to connect to Internet and Intranet via a WLAN access network and also connect to the home network and visited network of a 3 GPP system via the WLAN access network. To be specific, when accessing locally, a WLAN user terminal will get connected to the 3 GPP home network via the WLAN access network, as shown in FIG. 2; when roaming, it will get connected to the 3 GPP visited network via the WLAN access network. Some entities of the 3 GPP visited network are connected with corresponding entities of the 3 GPP home network, for instance, the 3 GPP Authentication, Authorization, Accounting (AAA) Proxy in the visited network is connected with the 3 GPP AAA Server in the home network, the WLAN Access Gateway (WAG) in the visited network is connected with the Packet Data Gateway (PDG) in the home network, as shown in FIG. 1. FIG. 1 and FIG. 2 are the schematic diagrams illustrating the networking architectures of a WLAN inter-working with a 3 GPP system under roaming and non-roaming circumstances, respectively.

As shown in FIG. 1 and FIG. 2, a 3 GPP system primarily includes Home Subscriber Server (HSS)/Home Location Register (HLR), 3 GPP AAA Server, 3 GPP AAA Proxy, WAG, PDG, Charging Gateway (CGw)/Charging information Collecting Function (CCF) and Online Charging System (OCS). User terminals, WLAN access network, and all the entities of the 3 GPP system together constitute a 3 GPP-WLAN inter-working network, which can be used as a WLAN service system. In this service system, 3 GPP AAA Server is in charge of the authentication, authorization, and accounting of a user, collecting the charging information sent from the WLAN access network and transferring the information to the charging system; PDG is in charge of the transmission of the user's data from the WLAN access network to the 3 GPP network or other packet networks; the charging system receives and records the subscribers' charging information transferred from the network, and OCS instructs the network to send the online charging information periodically in accordance with the expenses of the online charged subscribers, makes statistics and conducts control.

Under non-roaming circumstances, when a WLAN user terminal desires to access the Internet/Intranet directly, the user terminal can access Internet/Intranet via WLAN access network after it passes authentication and authorization at the AAA Server (AS) via the WLAN access network. Should the WLAN user terminal desire to access the service of 3 GPP packet switching (PS) domain as well, it may further request the service of Scenario 3 from the 3 GPP home network. That is, the WLAN user terminal initiates a authorization request for the service of Scenario 3 to the AS of the 3 GPP home network, which will carry out service authentication and authorization for that request; if it succeeds, AS will send an access accept message to the user terminal and assign a corresponding PDG for the user terminal. When a tunnel is established between the user terminal and the assigned PDG, the user terminal will be able to access services of the 3 GPP PS domain. Meanwhile, the offline charging system and OCS records the charging information in accordance with the user terminal's usage state of the network. In the roaming circumstances, when a WLAN user terminal desires to access the Internet/Intranet directly, it may make a request to the 3 GPP home network via a 3 GPP visited network for access to the Internet/Intranet. If the user terminal also desires to request the services of Scenario 3 to access the services of the 3 GPP PS domain, the user terminal needs to initiate via the 3 GPP visited network a service authorization process at the 3 GPP home network. The authorization is carried out likewise between the user terminal and AS of the 3 GPP home network. After the authorization succeeds, AS assigns the corresponding home PDG for the user terminal, then the user terminal will be able to access the service of 3 GPP PS domain of the home network after it establishes a tunnel with the assigned PDG via the WAG in the 3 GPP visited network.

It is seen from the above description, any user who desires to access a service needs to establish a service tunnel between the WLAN user terminal and the PDG. Unfortunately, there is still no definite solution for the implementation of establishment of such a service tunnel.

SUMMARY OF THE INVENTION

In accordance with one aspect of the disclosure, a method is useful for establishment of a service tunnel in a WLAN to establish a secured service data tunnel between a WLAN user terminal and a PDG. The method includes a service authentication authorization unit making authentication and authorization to the WLAN user terminal which requests a service and judging whether the authentication and authorization is successful, and if successful, generating the service authorization information including a shared communication key used for communication between the WLAN user terminal currently requesting a service and destination Packet Data Gateway (PDG), and otherwise, ending the current procedure of tunnel establishment. The method further includes the service authentication authorization unit sending to the PDG the service authorization information including the shared communication key. The method still further includes the PDG, based on the shared communication key, establishing a trust relation with the WLAN user terminal through negotiation, and if the establishment of the trust relation is successful, the PDG allocating tunnel resources for the WLAN user terminal, negotiating parameters and completing the tunnel establishment, and otherwise, ending the current procedure of tunnel establishment.

The service authentication authorization unit making authentication to the WLAN user terminal currently requesting a service may be implemented in accordance with a number of embodiments or modes.

In a first mode, the WLAN user terminal sends directly to the service authentication authorization unit an authentication request including the requested service identity and user identity of the WLAN user terminal. Having received the authentication request, the service authentication authorization unit, according to the user identity, makes identity authentication and service authorization to the WLAN user terminal currently requesting authentication. The service authentication authorization unit, according to identity of the requested service and subscription information of the user, then determines the destination PDG to be connected with the WLAN user terminal.

In a second mode, the WLAN user terminal sends a tunnel establishing request including the user identity to the destination PDG corresponding to the requested service. Having received the tunnel establishing request, the PDG sends to the service authentication authorization unit an authentication and authorization request including identity of the WLAN user terminal sending the request. Having received the authentication and authorization request, the service authentication authorization unit, according to the user identity, makes identity authentication and service authentication to the WLAN user terminal currently by sending a tunnel establishing request.

In a third mode, the WLAN user terminal sends to the service authentication authorization unit an authentication request that includes the identity of the requested service and the currently possessed certificate information indicates a successful identity authentication. The service authentication authorization unit, according to identity of the requested service and subscription information of the user, determines the destination PDG to be connected with the WLAN user terminal, and judges whether the received certificate information is legal, and if legal, the authentication being successful, and otherwise, the authentication being unsuccessful.

In a fourth mode, the WLAN user terminal sends a tunnel establishing request including identity of the requested service and the currently possessed certificate information indicating a successful identity authentication to the destination PDG corresponding to the requested service. Having received the tunnel establishing request, the destination PDG sends to the service authentication authorization unit an authentication and authorization request including the certificate information of the WLAN user terminal. The service authentication authorization unit judges whether the received certificate information is legal, and if legal, the authentication being successful, and otherwise, the authentication being unsuccessful.

The certificate information is a certificate currently possessed by the WLAN user terminal, or a certificate-index identity used for finding the certificate currently possessed by the WLAN user terminal. If the certificate information is a certificate-index identity, the procedure of judging whether the certificate information is legal includes the service authentication authorization unit finding the certificate currently possessed by the WLAN user terminal according to the received certificate-index identity, and then judging whether the found certificate is legal.

In a fifth mode, the WLAN user terminal sends to the service authentication authorization unit an authentication request including the identity of the requested service and the shared secret Transaction Identifier (TID) currently possessed by the WLAN user terminal. The service authentication authorization unit determines the destination PDG to be connected with the WLAN user terminal according to the identity of the requested service and the subscription information of the user, and judges whether the received shared secret TID is legal, and if legal, the authentication being successful, and otherwise, the authentication being unsuccessful.

In a sixth mode, the WLAN user terminal sends a tunnel establishing request including the identity of the requested service and a shared secret TID currently possessed by the WLAN user terminal to the destination PDG corresponding to the requested service. Having received the tunnel establishing request, the destination PDG sends to the service authentication authorization unit an authentication and authorization request including the shared secret TID of the WLAN user terminal. The service authentication authorization unit judges whether the received shared secret TID is legal, and if legal, the authentication being successful, and otherwise, the authentication being unsuccessful.

In a seventh mode, the WLAN user terminal sends to the service authentication authorization unit an authentication request including the identity of the requested service and the re-authentication identity currently possessed by the WLAN user terminal. The service authentication authorization unit, according to the service identity and the user subscription information, determines the destination PDG to be connected with the WLAN user terminal, and judges whether the re-authentication identity is legal, and if legal, the authentication being successful, and otherwise, the authentication being unsuccessful.

In an eighth mode, the WLAN user terminal sends a tunnel establishing request including the identity of the requested service and the re-authentication identity currently possessed by the WLAN user terminal to the destination PDG corresponding to the requested service. Having received the tunnel establishing request, the destination PDG sends to the service authentication authorization unit an authentication and authorization request including the re-authentication identity of the WLAN user terminal sending the request. The service authentication authorization unit judges whether the received re-authentication identity is legal, if legal, the authentication being successful, and otherwise, the authentication being unsuccessful.

Before the service authentication authorization unit sends the shared communication key to the destination PDG, the method may further include the destination PDG sending a service authorization request to the service authentication authorization unit. Having received the service authorization request, the service authentication authorization unit may send to the destination PDG the self-generated shared communication key and the related service authorization information.

For the first, third, fifth and seventh modes, between the service authorization information sending and the trust relation establishing steps, the method may further include the WLAN user terminal that currently requests a service sending a tunnel establishing request to the destination PDG.

The service authentication authorization unit may be an Authentication Authorization and Accounting (AAA) Server, or a 3 GPP AAA Server in a 3G system.

In accordance with another aspect of the disclosure, a method is provided for establishment of the service tunnel in WLAN. By means of the existing authentication mechanism of an interactive WLAN, the method makes the PDG that provides the service able to identify and authenticate the WLAN user terminal requesting a service, and then a secured service data tunnel can be established between the destination PDG and WLAN user terminal. Therefore, the data transmission is secure and reliable, and the implementation thereof is easy and flexible.

A service authentication authorization unit for establishment of service tunnel in WLAN, including: an authentication and authorization sub-unit, configured to make authentication and authorization for a WLAN user terminal which requests a service; a judging sub-unit, configured to judge whether the authentication and authorization is successful; a generating sub-unit, configured to generate service authorization information, the service authorization information including a shared communication key used for communication between the WLAN user terminal currently requesting a service and a destination Packet Data Gateway (PDG), if the judging sub-unit determines that the authentication and authorization is successful; and a sending sub-unit, configured to send to the destination PDG the service authorization information including the shared communication key.

A system for establishment of service tunnel in WLAN, including: a WLAN user terminal, configured to request a service; and an service authentication authorization unit, configured to make authentication and authorization for the WLAN user terminal, judge whether the authentication and authorization is successful; if the authentication and authorization is successful, generate service authorization information including a shared communication key used for communication between the WLAN user terminal currently requesting a service and a destination Packet Data Gateway (PDG), and configured to send to the PDG the service authorization information that includes the shared communication key; if the authentication and authorization is failed, configured to end the current procedure of tunnel establishment; the destination PDG, configured to establish a trust relation with the WLAN user terminal through negotiation based on the shared communication key in the received service authorization information, and if the establishment of the trust relation is successful, the destination PDG further configured to allocate tunnel resources for the WLAN user terminal currently requesting the service, negotiate parameters and complete the establishment of the tunnel; otherwise, the destination PDG configured to end the current procedure of tunnel establishment.

DETAILED DESCRIPTION OF PREFERRED EMBODIMENTS

Figure 1:
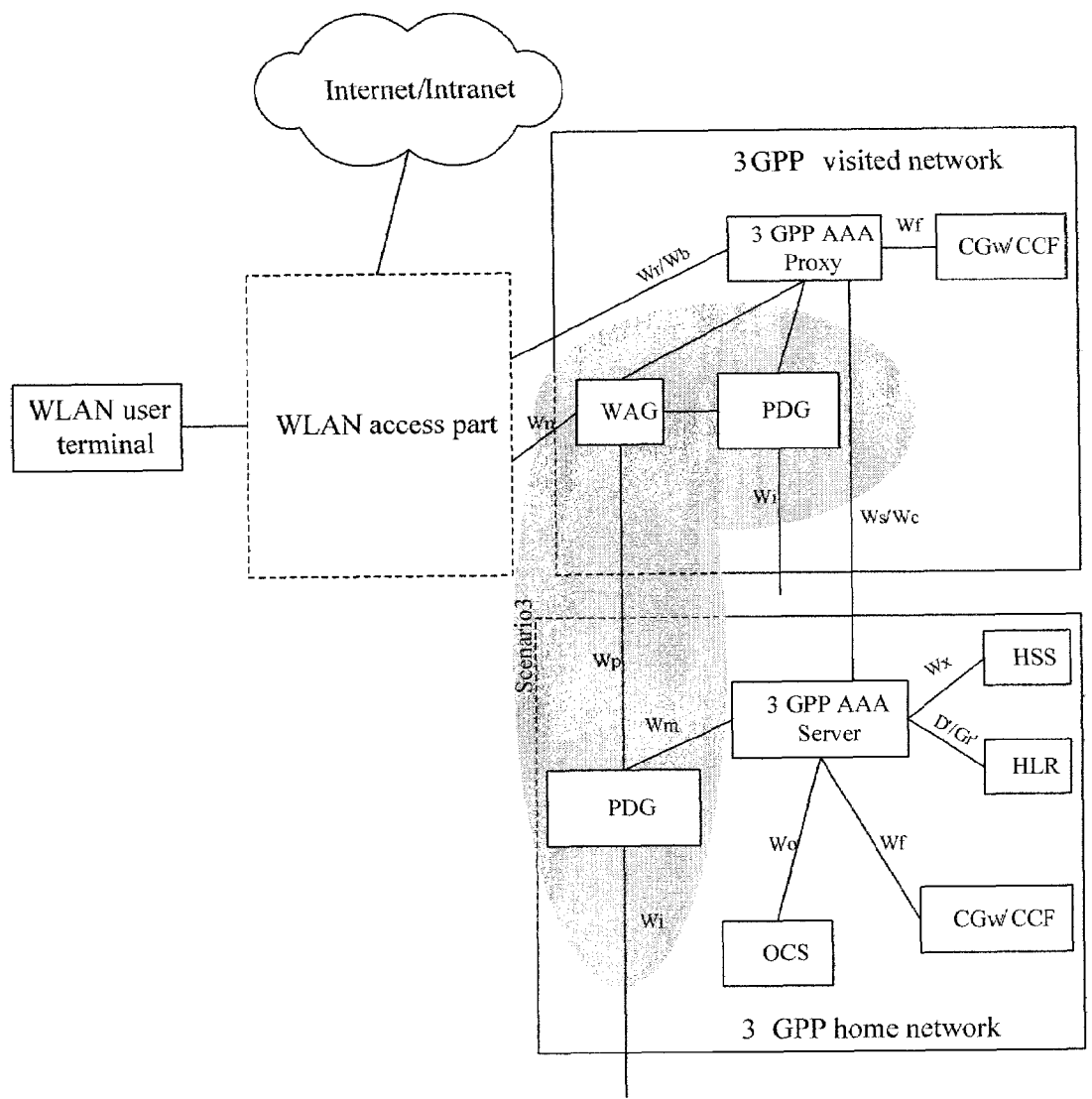
FIG. 1 is a schematic diagram illustrating the network structure of inter-working WLAN system and 3 GPP system under roaming circumstances in the prior art.
Figure 2:
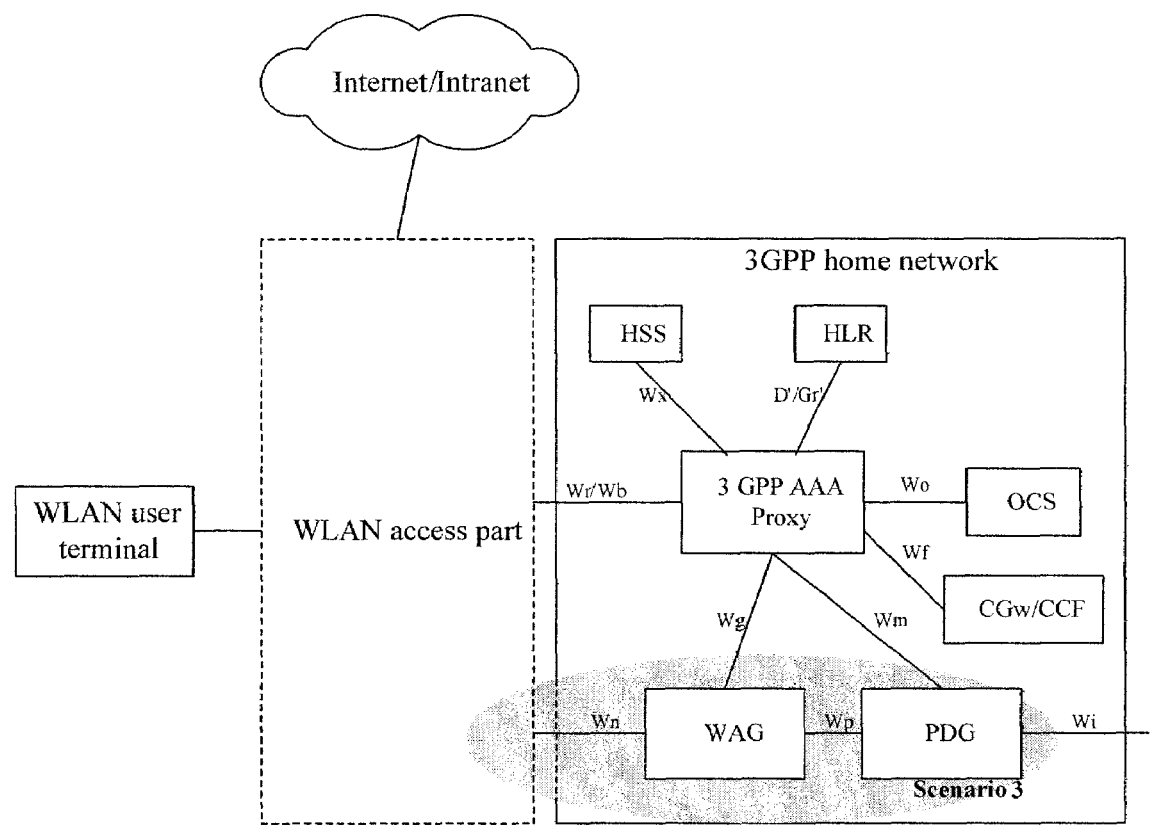
FIG. 2 is a schematic diagram illustrating the network structure of inter-working WLAN system and 3 GPP system under non-roaming circumstances in the prior art.
Figure 3:
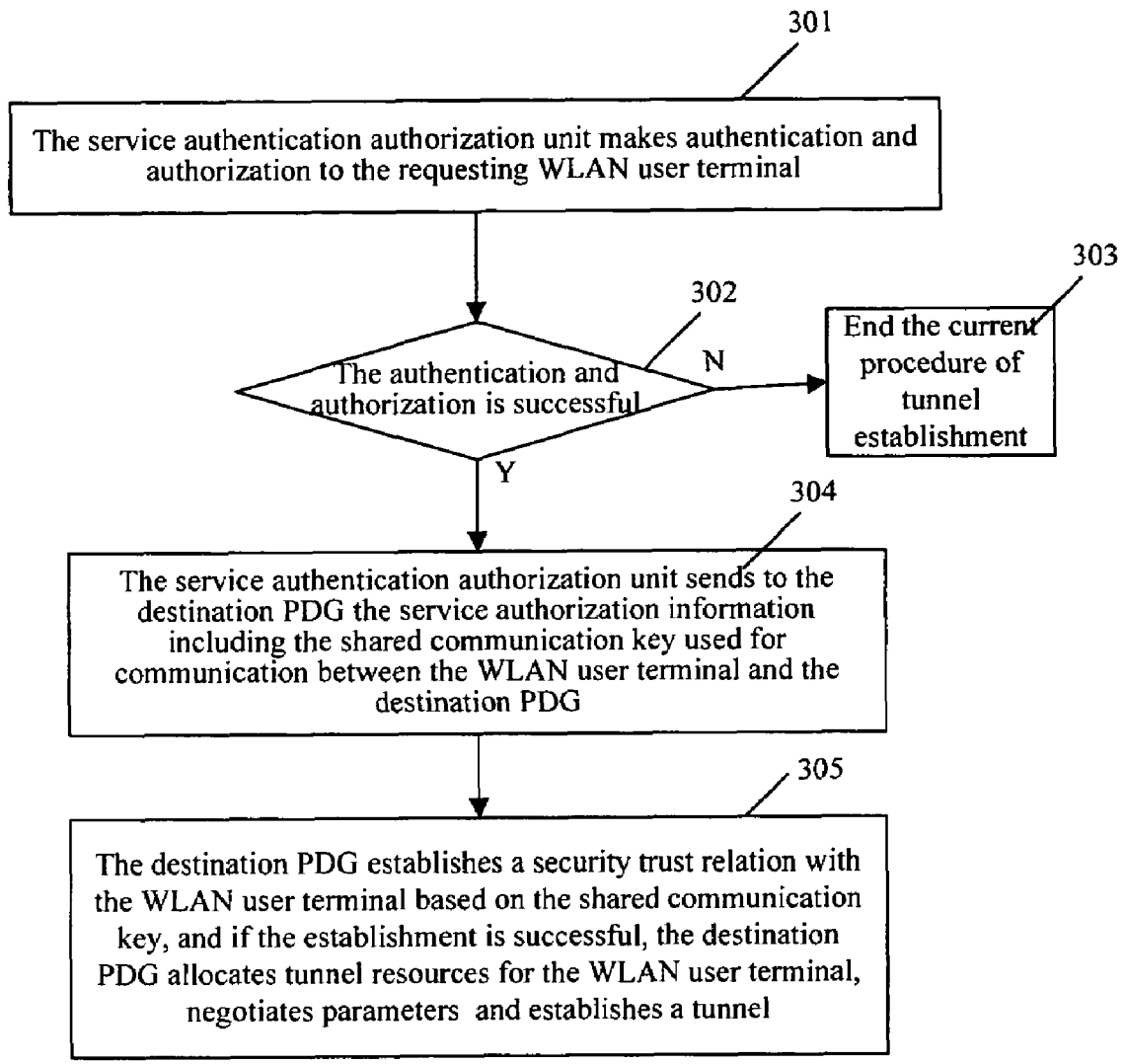
FIG. 3 shows the flowchart for implementing one aspect of the disclosure.

As shown in FIG. 3, the implementation of the disclosed method generally includes the following steps.

Step 301-step 303. The WLAN user terminal that currently requests a service is authenticated and authorized by the service authentication authorization unit, where the authentication and authorization include user identification authentication, service authentication and service authorization. The service authentication authorization unit determines whether the authentication and authorization to the WLAN user terminal currently requesting a service is successful; if successful, proceed to step 304; otherwise, the authentication to the WLAN user terminal fails, and the current procedure of service tunnel establishment is ended.

The service authentication authorization unit can be the AAA Server. In a 3G system, the service authentication authorization unit can be a 3 GPP AAA Server. If the WLAN user terminal is located in a visited network, the AAA Proxy forwards the message sent by the WLAN user terminal to the AAA Server. In the following, the AAA Server is taken as the service authentication authorization unit.

In these steps, there are several situations during the procedure of AAA Server authenticating a WLAN user terminal. In a first situation, the WLAN user terminal sends the authentication request directly to the AAA Server, and the authentication request at least includes the user identity, the identity of the requested service, and, further, the user subscription information, where the identity of the request service can be the service Access Point Name (APN) corresponding to the requested service.

Having received the authentication request sent by the WLAN user terminal, the AAA Server, on one hand, determines the PDG for processing the service according to the service identity and user subscription information carried in the authentication request, on the other hand, initiates the identification authentication and service authorization to the requesting WLAN user terminal according to the user identity and other information carried in the authentication request, where the other information includes authentication password of the requesting WLAN user terminal, user subscription information, and etc. AAA Server determines whether the WLAN user terminal is a legal user through the authentication procedure and according to the user subscription information and the information carried in the request, if the WLAN user terminal is legal and authorized to be provided with the requesting service, the authentication to the WLAN user terminal is successful, then proceed to step 304; otherwise, the authentication to the WLAN user terminal fails, then end the current procedure of service tunnel establishment.

Here, the authentication request sent from the WLAN user terminal to AAA Server may carry various kinds of information, such as the identity information of the user, identity of the requested service (W-APN), and authentication interaction information.

In a second situation, the requesting WLAN user terminal knows through an analytical procedure the PDG corresponding to the requested service, that is, the user terminal knows the PDG that is able to provide the requested service. Then, according to the address of the destination PDG obtained through the analytical procedure, the requesting WLAN user terminal sends directly to the destination PDG a tunnel establishing request, which at least carries the user identity, where the address of the destination PDG may be obtained through analysis based on the service name.

Having received the tunnel establishing request sent by the WLAN user terminal, the destination PDG obtains the user identity carried in the tunnel establish request and then initiates an authentication and authorization request to the AAA Server, where the authentication and authorization request includes the user identity and other related information such as authentication password of the requesting WLAN user terminal and the user subscription information. Having received the authentication, and authorization request, the AAA Server determines whether the WLAN user terminal is a legal user according to the user identity and user subscription information carried in the authentication and authorization request, if the user terminal is legal and authorized to be provided with the requested service, the authentication to the WLAN user terminal is successful, then proceed to step 304; otherwise, the authentication to the WLAN user terminal fails, then end the current procedure of service tunnel establishment.

In a third situation, the requesting WLAN user terminal sends to the AAA Server an authentication request that includes currently possessed certificate information indicating successful identity authentication as well as the identity of the requested service. The certificate information refers to the certificate itself currently possessed by the WLAN user terminal, or a certificate-index identity used for inquiring the certificate currently possessed by the WLAN user terminal.

Here, the above mentioned certificate is obtained through a public certificate method. Specifically speaking, the certificate method is: the user obtains a private key used for data encryption, the certificate server generates a public key that is open to public, and the private key obtained by the user and corresponding public key of the certificate server constitute the certificate, which is freely obtained by relevant devices including the user itself for use in confirming the user.

Having received the authentication request sent by the WLAN user terminal, the AAA Server, on one hand, determines the destination PDG for processing the requested service according to the service identity and user subscription information carried in the authentication request, on the other hand, confirms the certificate information of the WLAN user terminal carried in the authentication request, that is, judges whether the certificate currently possessed by the WLAN user terminal is legal according to the authentication related information recorded by itself or authentication related information obtained through interaction with certificate service system, if the certificate is legal, the authentication to the requesting WLAN user terminal is successful, then proceed to step 304; otherwise, the authentication to the requesting WLAN user terminal fails, then end the current procedure of service tunnel establishment. During the procedure of certificate information confirmation, if the certificate information includes a certificate-index identity, AAA Server should first find the certificate currently possessed by the WLAN user terminal in certificate service system according to the received certificate-index identity, and then judges whether the certificate is legal.

In a fourth situation, the requesting WLAN user terminal sends to AAA Server an authentication request that includes the currently possessed shared secret Transaction ID (TID) and the identity of the requested service.

Here, the shared secret TID is obtained through a shared secret method. The shared secret method is: under the Generic Bootstrapping Architecture (GBA) framework, after the Boot-trapping Service Function (BSF) has interacted with the user and generated an encrypting key, BSF sends a TID to the user for identifying the shared secret between them. The shared secret includes security information such as encrypting key, random sequence and checking number. When the user requests the operator-controlled Network Application Function (NAF) for a service, the user sends the TID) to NAF. NAF sends the TID to BSF. BSF judges whether the TID is legal, if the TID is legal, the initial authentication is successful. Then the corresponding shared secret is sent to NAF which makes further authentication to the user by means of the shared secret to establish a trust relation with the user. BSF is the function entity that provides the user with authentication. NAF is the function entity that provides services. The relation between BSF and NAF is similar to the relation between AAA Server and PDG, and one BSF can provide user authentication service for multiple NAFs.

Having received the authentication request sent by the WLAN user terminal, the AAA Server, on one hand, determines the PDG for processing the requested service according to the service identity and the user subscription information carried in the authentication request, on the other hand, confirms the shared secret TID provided by the WLAN user terminal in the authentication request, that is, judges whether the shared secret TID is legal according to authentication related information recorded by itself, if the shared secret TID is legal, the authentication to the requesting WLAN user terminal is successful, proceed to step 304; otherwise, the authentication to the requesting WLAN user terminal fails, then end the current procedure of service tunnel establishment.

In a fifth situation, the requesting WLAN user terminal sends to the AAA Server an authentication request that includes currently possessed re-authentication identity and the identity of the requested service.

Having received the authentication request sent by the WLAN user terminal, the AAA Server, on one hand, determines the PDG for processing the service according to the service identity-and the user subscription information carried in the authentication request, on the other hand, confirms the re-authentication identity provided by the WLAN user terminal in the authentication request, that is, judges whether the re-authentication identity is legal according to authentication related information recorded by itself, if the re-authentication identity is legal, the authentication to the requesting WLAN user terminal is successful, then proceed to step 304; otherwise, the authentication to the WLAN user terminal fails, then end the current procedure of service tunnel establishment.

The above mentioned third, fourth and fifth situations are similar except that, during access authentication, the security levels of the assigned certificate, the shared secret TID and the re-authentication identity are different, i.e. successful authentication based on different information means different level of security. Compared with the re-authentication identity, authentication based on the certificate and shared secret TID have higher security levels since it is less possible to steal or imitate the certificate or the shared secret TID. The certificate, shared secret TID and re-authentication identifier can be obtained during the access authentication to the WLAN user terminal, or can be updated by AAA Server whenever necessary. The access authentications in these three situations comply with the 802.1X access authentication procedure, which includes the following.

After the wireless connection is set up between the WLAN user terminal and the WLAN access network, the network or the WLAN user terminal initiates an access authentication procedure, and the WLAN access network sends to the WLAN user terminal a user name request message. After receiving the user name request message, the WLAN user terminal sends to AAA Server the authentication information required for certification, AAA Server implements the access authentication and authorization judgment according to the obtained information related with the user terminal and the self-stored information, if the authentication and authorization is successful, authorize the user an accessing range according to the subscription information and perform the sequent operations; otherwise, notify the user terminal that the access authentication and authorization fails, and end the current access authorization procedure.

In the above mentioned third, fourth and fifth situations, the WLAN user terminal can also put the certificate, shared secret TID or re-authentication identity in the tunnel establishing request that is sent to the PDG. Having received the certificate, shared secret TID or re-authentication identity, the PDG forwards the authentication request to AAA Server which then makes the authentication to the requesting WLAN user terminal. The authentication procedure performed by AAA Server is the same as that mentioned above.

In addition, there is another situation: if there exists a service analysis unit used for initial access processing, the WLAN user terminal currently requesting a service will send to the service analysis unit the tunnel establishing request which carries the user identity, the user subscription information and the name of the requested service, etc. Having received the tunnel establishing request, the service analysis unit sends an authentication and authorization request including the user identity and the user subscription information to the service authentication authorization unit. The service authentication authorization unit makes identity authentication and service authorization to the requesting user terminal according to the user subscription information of the requesting WLAN user terminal. Here, the service analysis unit can be implemented by a PDG.

Step 304: The AAA Server generates in itself the service authorization information that at least includes a shared communication key for communication between the requesting WLAN user terminal and the destination PDG, and sends the shared communication key to the destination PDG. At the same time, the requesting WLAN user terminal also generates a shared communication key through negotiation with AAA Server. Then AAA Server sends a service authorization message to the destination PDG to permit the destination PDG to provide the requested service for the requesting WLAN user terminal. AAA Server may actively send the service authorization message to the destination PDG, or the destination PDG may send the service authorization request to AAA Server and then obtains the service authorization message from AAA Server.

The procedure of generating the shared communication key in this step may include presetting a shared key Ki in the HLR/HSS and the WLAN user terminal, and saving Ki in the SIM or USIM mode; then, taking a SIM triplets as an example, HLR sending to AAA Server the appropriate derived 3-vector including a random number RAND and a key Kc, based on which a key Ks used for shared communication between WLAN user terminal and the destination PDG can be generated; meanwhile, AAA Server sending the RAND and Kc to the WLAN user terminal, and the WLAN user terminal generating as well the shared communication key Ks based on the RAND and Kc. This is the above mentioned procedure of generating the shared communication key through negotiation. This shared communication key Ks is used for data communication between the WLAN user terminal and the destination PDG. The SIM and USIM mentioned herein refer to the method of triplets or quintets authentication in the prior art.

AAA Server may put the shared communication key in the service authorization message that is sent to the destination PDG, and may sent other service authorization information while sending the service authorization message to the destination PDG, where the other service authorization information refers to relevant user information of the requesting WLAN user terminal, authentication passing information, authorized WLAN-APN, and so on. Obviously, such information as shared communication key and authorized WLAN-APN can also be sent respectively.

In addition, the precondition of AAA Server sending information to the destination PDG is: a trusted secured channel between them has been established in advance, which is a technique in the prior art, for instance, presetting a shared key, or establishing a special channel shared by multiple users between station devices, or connecting each other via a special physical line. Detailed description thereabout is omitted here.

Step 305: The WLAN user terminal and the destination PDG make mutual authentication and negotiation by means of the shared communication key Ks to establish a mutual trust relation. Once the mutual trust relation has been established, the destination PDG allocates tunnel resources to the WLAN user terminal, negotiates parameters with the WLAN user terminal to complete the establishment of a secured service data tunnel, and then provides the requested service for the WLAN user terminal. The procedures of tunnel resource allocation and parameter negotiation mentioned here are similar to the procedure of tunnel establishment in VPN. The tunnel resource allocation refers to allocating resources such as the user IP address inside the tunnel, tunnel identity, and memory space for user information. The parameter negotiation refers to negotiating such parameters as the encryption algorithm used and protocol versions. If the mutual authentication is unsuccessful, end the current procedure of tunnel establishment. The secured communication mentioned here means that both parties should encrypt the transmitting data with the shared communication key, decrypt and check the receiving data with the same key.

If the WLAN user terminal requesting a service in step 301 asks authentication with AAA Server in the first, third, fourth or fifth situation, the WLAN user terminal needs to send a tunnel establishing request to the destination PDG before this step, and AAA Server can send the address of the destination PDG independently or with the shared communication key to the WLAN user terminal.

During the procedure mentioned in this step for establishing a trust relation between the WLAN user terminal and the destination PDG through mutual authentication and negotiation, the shared communication key Ks is used as the basic pre-shared key for completing further negotiation. For example, the shared communication key Ks can be used as a basic pre-shared key of the existing protocols, like IKE and TLS, to complete further negotiation. In addition, the security authentication mechanism may be used as well. For example, the WLAN user terminal and the destination PDG may first generate a random number respectively, and calculate own key information with the self-generated random number and Ks, respectively; during security authentication, one party first generates its own authentication key with the key information of the other party, calculates a signature used for this authentication according to the digital signature algorithm agreed by the two parties, the self-generated key information, the self-generated authentication key and the shared key, and then sends the calculated signature and key information to the other party; then, the other party compares the calculated and currently used signature with the received signature, and determines according to the result of comparison whether the other party is legal. If both parties are legal, the authentication is successful; otherwise, the authentication fails.

EMBODIMENT 1

Figure 4:
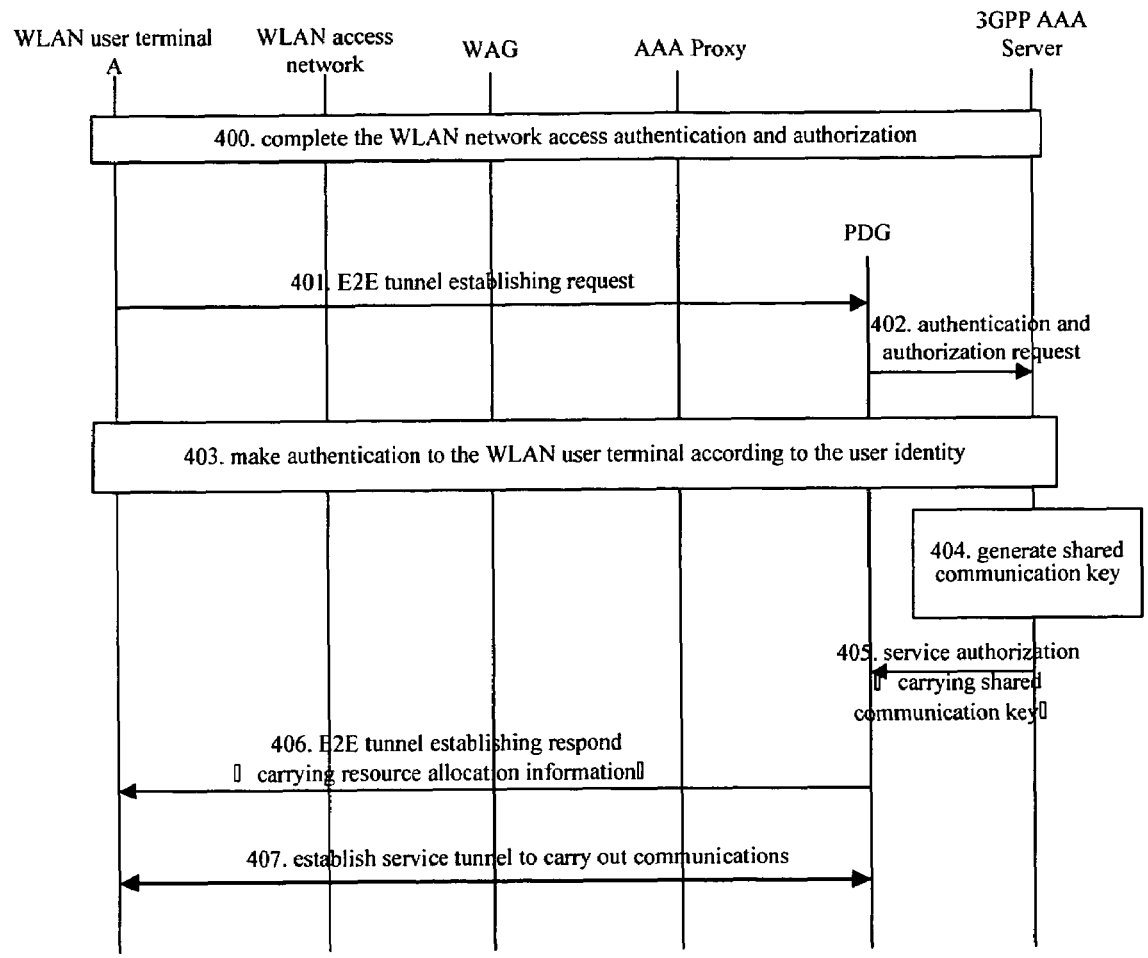
FIG. 4 shows the flowchart for implementing one embodiment of the disclosed method.

As shown in FIG. 4, in a 3 GPP-WLAN inter-working network, the WLAN user terminal A selects a service, and finds that the selected service is provided by a PDG through service analysis. Then the PDG is the destination PDG to which the WLAN user terminal to be connected. In this embodiment, the service authentication authorization unit is 3 GPP AAA Server. In this embodiment, when the user terminal A is accessing to WLAN, firstly, WLAN access network and 3 GPP AAA Server perform access authentication and authorization, as shown in step 400. Later, When the WLAN user terminal A requests a service provided by the PDG, the procedure of establishing tunnel between the WLAN user terminal A and the PDG includes the following steps.

Step 401: the WLAN user terminal sends an End-to-End (E2E) tunnel establishing request, which includes user identity and user subscription information used for authentication, to the PDG.

Step 402-step 403: having received the E2E tunnel establishing request, the PDG sends a authentication and authorization request carrying the authentication information, which is originally included in the tunnel establishing request, to the 3 GPP AAA Server. Having received the authentication and authorization request, the 3 GPP AAA Server makes authentication to the WLAN user terminal A according to the received authentication information, and then judges whether the authentication is successful. In this embodiment, it is supposed that the authentication is successful.

Step 404-step 405: the 3 GPP AAA Server, according to the preset shared key Kc, generates a shared communication key used for security communication between the WLAN user terminal A and the PDG, and sends the key to the PDG. Meanwhile, the WLAN user terminal A also generates a shared communication key according to the preset shared key Kc. Meanwhile the 3 GPP AAA Server sends to the PDG a service authorization message to permit the PDG to provide the requested services to the WLAN user terminal A. In this embodiment, the key sending to the PDG is put in the service authorization message which includes as well the authorized WLAN-APN, etc.

Step 406-step 407: the PDG returns to the WLAN user terminal A an E2E tunnel establishing response, and with the shared communication Key the PDG allocates tunnel resources to the WLAN user terminal A, negotiates relevant parameters, and establishes a secured service data tunnel with the WLAN user terminal A, thereby providing the requested service data to the WLAN user terminal A. During the data transmission between the two parties, each party makes encryption and decryption as well as examination to the tunnel data with the obtained key separately.

EMBODIMENT 2

Figure 5:
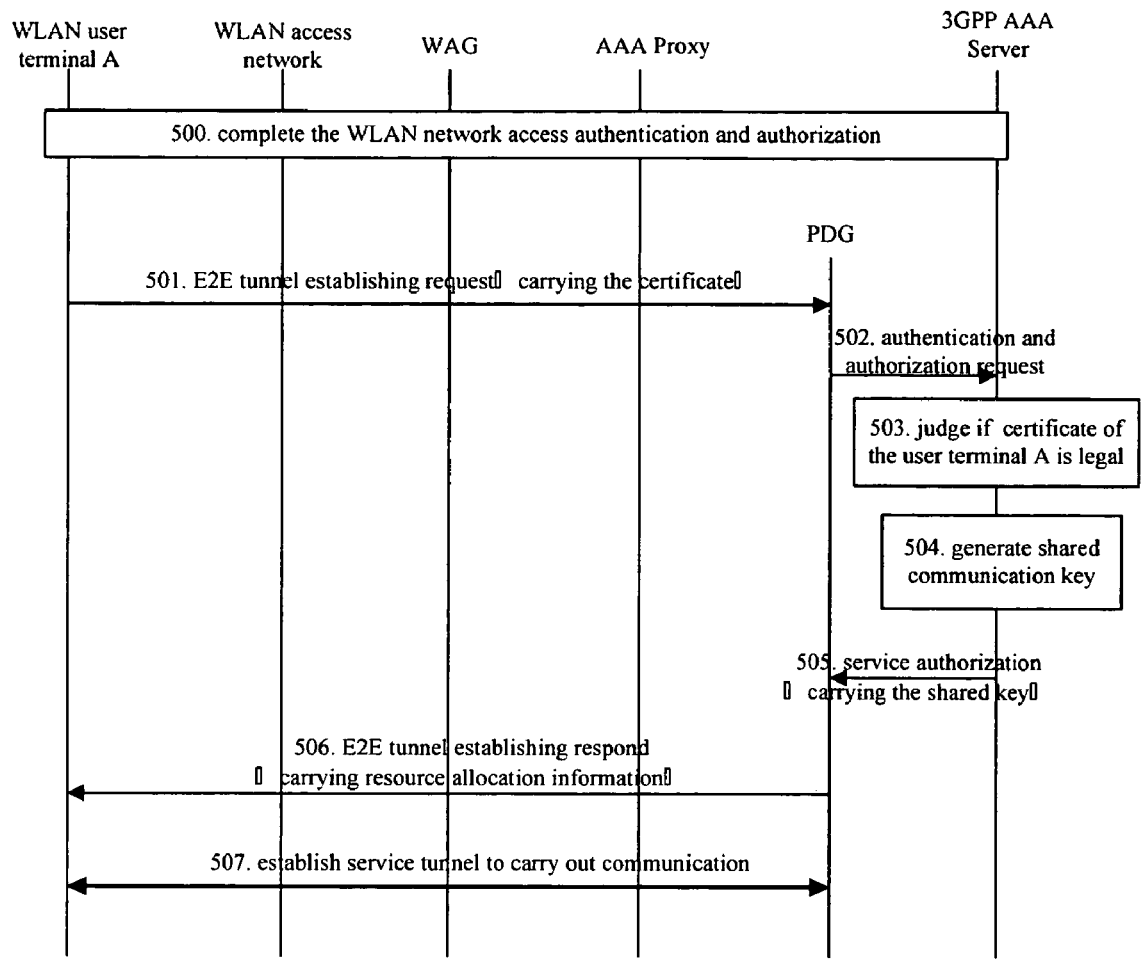
FIG. 5 shows the flowchart for implementing another embodiment of the disclosed method.

As shown in FIG. 5, the condition and implementation of this embodiment is similar to that of Embodiment 1. The only differences are: in step 501, when the WLAN user terminal A sends a tunnel establishing request to the PDG, the request includes the currently possessed certificate or an certificate-index identity used for certificate query; so in step 503, the 3 GPP AAA Server, according to the self-recorded information or the information obtained through interaction with the certificate server, determines whether the certificate currently possessed by the WLAN user terminal is legal, if so, the authentication is successful, and execute steps 504 to 507, otherwise; the authentication fails, and then end the current procedure.

In this embodiment, step 502 is completely the same as step 402 of Embodiment 1, and Steps 504 to 507 are completely the same as Steps 404 to 407 of Embodiment 1, respectively.

EMBODIMENT 3

Figure 6:
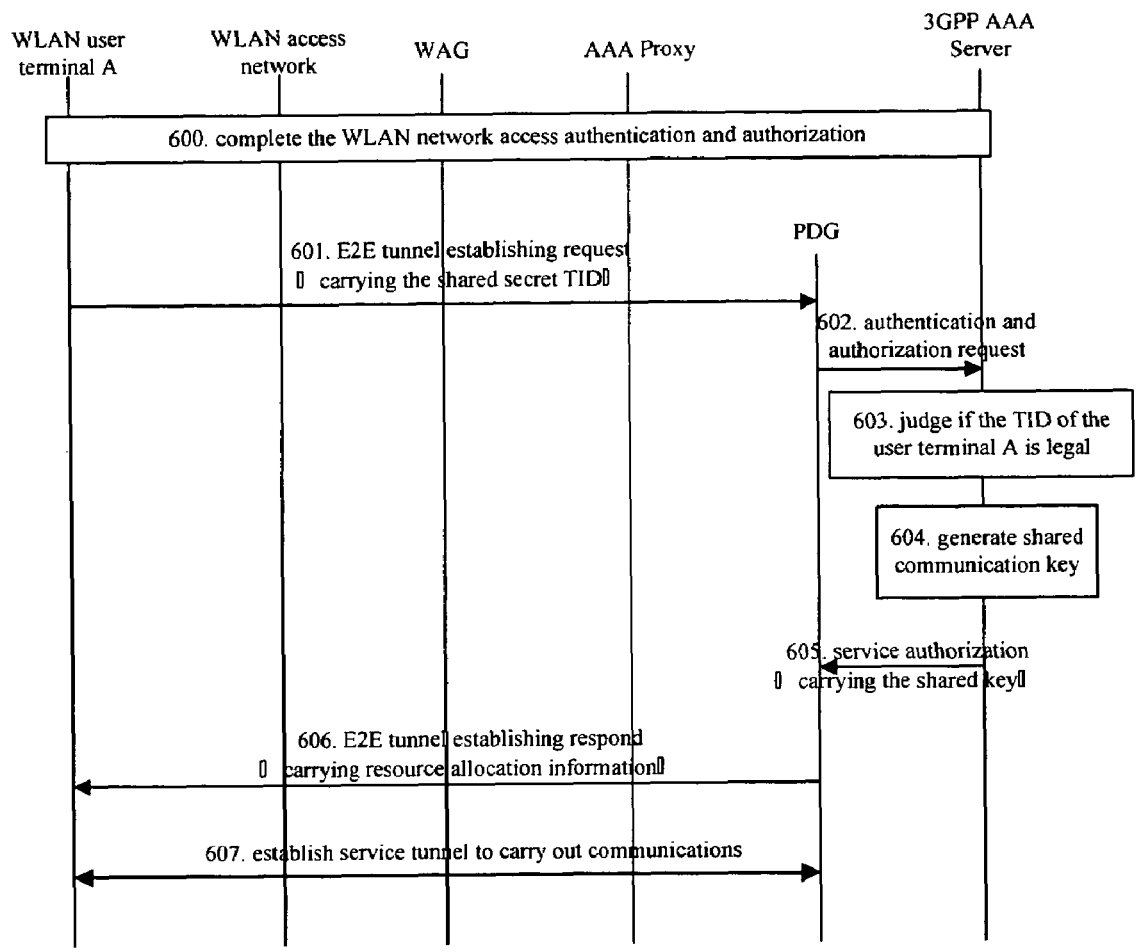
FIG. 6 shows the flowchart for implementing yet another embodiment of the disclosed method.

As shown in FIG. 6, the condition and implementation of this embodiment is similar to that of Embodiment 1 except that, in step 601, when the WLAN user terminal A sends a tunnel establishing request to the PDG, the request includes a shared secret TID currently possessed by the WLAN user terminal A. So in step 603, the 3 GPP AAA Server also acts as an entity of BSF and determines whether the received TID is legal according to the self-recorded information; if legal, the initial authentication is successful, then the 3 GPP AAA Server sends the TID and related shared secret information, which at least includes the Ks, to the PDG that is an entity of NAF in the GBA framework in this case, and the PDG, according to the shared secret information, establishes the trust relation with the user terminal through further negotiation with the user terminal, and then executes Steps 604 to 607; otherwise, the authentication fails, the current procedure is ended, and the user terminal may need to obtain the TID through re-interaction with the 3 GPP AAA Server.

In this embodiment, step 602 is completely the same as step 402 in Embodiment 1, and Steps 604 to 607 are completely the same as Steps 404 to 407 in Embodiment 1, respectively.

The foregoing description sets forth a number of preferred embodiments and is not to be construed to limit the protective scope of the following claims.

The invention claimed is:

1. A method for establishment of a service tunnel in a Wireless Local Area Network (WLAN), comprising:
   (A) a service authentication authorization unit making authentication and authorization to a WLAN user terminal which requests a service and then judging whether the authentication and authorization is successful, and if successful, generating service authorization information including a shared communication key used for communication between the WLAN user terminal and a destination Packet Data Gateway (PDG), and otherwise, ending the current procedure of tunnel establishment;
   (B) the service authentication authorization unit sending to the PDG the service authorization information that includes the shared communication key; and,
   (C) the PDG, based on the shared communication key in the service authorization information, establishing a trust relation with the WLAN user terminal through negotiation, and if establishment of the trust relation is successful, the destination PDG allocating tunnel resources for the WLAN user terminal, negotiating parameters and completing the establishment of the tunnel, and otherwise, ending the current tunnel establishment procedure.

2. A method according to claim 1, wherein, in (A), the authentication to the WLAN user terminal further comprises:
the WLAN user terminal sending directly to the service authentication authorization unit an authentication request including an identity of the requested service and a user identity of the WLAN user terminal;
having received the authentication request, the service authentication authorization unit, according to the user identity, making identity and service authentication to the WLAN user terminal; and
the service authentication authorization unit, according to the identity of the requested service and user subscription information, determining the destination PDG to be connected with the WLAN user terminal.

3. A method according to claim 2, further comprising, between (B) and (C), the WLAN user terminal that currently requests a service sending a tunnel establishing request to the destination PDG.

4. A method according to claim 1, wherein, in (A), the authentication to the WLAN user terminal further comprises:
the WLAN user terminal sending a tunnel establishing request including the user identity to the destination PDG corresponding to the requested service;
having received the tunnel establishing request, the PDG sending to the service authentication authorization unit an authentication and authorization request including the user identity of the WLAN user terminal; and
having received the authentication and authorization request, the service authentication authorization unit, according to the user identity, making identity and service authentication to the WLAN user terminal.

5. A method according to claim 1, wherein, in (A), the authentication to the WLAN user terminal further comprises:
the WLAN user terminal sending to the service authentication authorization unit an authentication request that includes an identity of the requested service and currently possessed certificate information indicating a successful identity authentication; and
the service authentication authorization unit, according to the identity of the requested service and user subscription information, determining the destination PDG to be connected with the WLAN user terminal, and judging whether the received certificate information is legal, and if legal, the authentication being successful, and otherwise, the authentication being unsuccessful.

6. A method according to claim 5, further comprising, between (B) and (C), the WLAN user terminal that currently requests a service sending a tunnel establishing request to the destination PDG.

7. A method according to claim 5, wherein the certificate information is a certificate currently possessed by the WLAN user terminal, or a certificate-index identity used for finding the certificate currently possessed by the WLAN user terminal.

8. A method according to claim 7, wherein, if the certificate information is the certificate-index identity, the judging whether the certificate information is legal comprises the service authentication authorization unit finding the certificate currently possessed by the WLAN user terminal according to the received certificate-index identity, and then judging whether the found certificate is legal.

9. A method according to claim 1, wherein, in (A), the authentication to the WLAN user terminal further comprises:
the WLAN user terminal sending a tunnel establishing request, including an identity of the requested service and currently possessed certificate information indicating a successful authentication, to the destination PDG corresponding to the requested service;
having received the tunnel establishing request, the destination PDG sending to the service authentication authorization unit an authentication and authorization request including certificate information of the WLAN user terminal; and
the service authentication authorization unit judging whether the received certificate information is legal, and if legal, the authentication being successful, and otherwise, the authentication being unsuccessful.

10. A method according to claim 9, wherein the certificate information is a certificate currently possessed by the WLAN user terminal, or a certificate-index identity used for finding the certificate currently possessed by the WLAN user terminal.

11. A method according to claim 10, wherein, if the certificate information is the certificate-index identity, the judging whether the certificate information is legal comprises the service authentication authorization unit finding the certificate currently possessed by the WLAN user terminal according to the received certificate-index identity, and then judging whether the found certificate is legal.

12. A method according to claim 1, wherein, in (A), the authentication to the WLAN user terminal further comprises:
the WLAN user terminal sending to the service authentication authorization unit an authentication request including an identity of the requested service and a shared secret Transaction Identifier (TID) currently possessed by the WLAN user terminal; and
the service authentication authorization unit determining the destination PDG to be connected with the WLAN user terminal according to the identity of the requested service and user subscription information, and judging whether the received shared secret TID is legal, if legal, the authentication being successful; otherwise, the authentication being unsuccessful.

13. A method according to claim 12, further comprising, between (B) and (C), the WLAN user terminal that currently requests a service sending a tunnel establishing request to the destination PDG.

14. A method according to claim 1, wherein, in (A), the authentication to the WLAN user terminal further comprises:
the WLAN user terminal sending a tunnel establishing request, including an identity of the requested service and a shared secret TID currently possessed by the WLAN user terminal, to the destination PDG corresponding to the requested service;
having received the tunnel establishing request, the destination PDG sending to the service authentication authorization unit an authentication and authorization request including the shared secret TID of the WLAN user terminal; and
the service authentication authorization unit judging whether the received shared secret TID is legal, illegal, the authentication being successful; otherwise, the authentication being unsuccessful.

15. A method according to claim 1, wherein, in (A), the authentication to the WLAN user terminal further comprises:
the WLAN user terminal sending to the service authentication authorization unit an authentication request including an identity of the requested service and a re-authentication identity currently possessed by the WLAN user terminal; and the service authentication authorization unit, according to the service identity and the user subscription information, determining the destination PDG to be connected with the WLAN user terminal, and judging whether the re-authentication identity is legal, if legal, the authentication being successful; otherwise, the authentication being unsuccessful.

16. A method according to claim 15, further comprising, between (B) and (C), the WLAN user terminal that currently requests a service sending a tunnel establishing request to the destination PDG.

17. A method according to claim 1, wherein, in (A), the authentication to the WLAN user terminal further comprises:
the WLAN user terminal sending a tunnel establishing request, including an identity of the requested service and a re-authentication identity currently possessed by the WLAN user terminal, to the destination PDG corresponding to the requested service;
having received the tunnel establishing request, the destination PDG sending to the service authentication authorization unit an authentication and authorization request including the re-authentication identity; and
the service authentication authorization unit judging whether the re-authentication identity is legal, if legal, the authentication being successful; otherwise, the authentication being unsuccessful.

18. A method according to claim 1, wherein (B), before sending the shared communication key to the destination PDG, further comprises the destination PDG sending a service authorization request to the service authentication authorization unit, and having received the service authorization request, the service authentication authorization unit sending to the destination PDG the shared communication key generated by the destination PDG and the service authorization information.

19. A method according to claim 1, wherein said service authentication authorization unit is an Authentication Authorization and Accounting Server.

20. A method according to claim 19, wherein said service authentication authorization unit is a 3 GPP Authentication Authorization and Accounting Server.

21. A service authentication authorization unit for establishment of service tunnel in Wireless Local Area Network (WLAN), comprising:
an authentication and authorization sub-unit, configured to make authentication and authorization for a WLAN user terminal which requests a service;
a judging sub-unit, configured to judge whether the authentication and authorization is successful;
a generating sub-unit, configured to generate service authorization information, the service authorization information including a shared communication key used for communication between the WLAN user terminal currently requesting a service and a destination Packet Data Gateway (PDG), if the judging sub-unit determines that the authentication and authorization is successful; and
a sending sub-unit, configured to send to the destination PDG the service authorization information including the shared communication key.

22. A system for establishment of service tunnel in Wireless Local Area Network (WLAN), comprising:
a WLAN user terminal, configured to request a service;
an service authentication authorization unit, configured to make authentication and authorization for the WLAN user terminal, judge whether the authentication and authorization is successful; if the authentication and authorization is successful, generate service authorization information including a shared communication key used for communication between the WLAN user terminal currently requesting a service and a destination Packet Data Gateway (PDG), and configured to send to the PDG the service authorization information that includes the shared communication key; if the authentication and authorization is failed, configured to end the current procedure of tunnel establishment;
the destination PDG, configured to establish a trust relation with the WLAN user terminal through negotiation based on the shared communication key in the received service authorization information, and if the establishment of the trust relation is successful, the destination PDG further configured to allocate tunnel resources for the WLAN user terminal currently requesting the service, negotiate parameters and complete the establishment of the tunnel; otherwise, the destination PDG configured to end the current procedure of tunnel establishment.

* * * * *